US010759459B2

(12) United States Patent
Kurata et al.

(10) Patent No.: US 10,759,459 B2
(45) Date of Patent: Sep. 1, 2020

(54) DISPLAY-COUPLED HANDCART

(71) Applicant: TOSHIBA TEC KABUSHIKI KAISHA, Tokyo (JP)

(72) Inventors: Masachika Kurata, Fujinomiya Shizuoka (JP); Takahiro Saitou, Izunokuni Shizuoka (JP); Yukiko Yokoyama, Sunto Shizuoka (JP); Noriyoshi Hara, Mishima Shizuoka (JP); Hitoshi Iizaka, Fuji Shizuoka (JP); Hidehiro Naito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/268,720

(22) Filed: Feb. 6, 2019

(65) Prior Publication Data
US 2019/0270470 A1 Sep. 5, 2019

(30) Foreign Application Priority Data

Mar. 2, 2018 (JP) ................................ 2018-037832

(51) Int. Cl.
*B62B 3/14* (2006.01)
*B62B 5/00* (2006.01)

(52) U.S. Cl.
CPC .......... *B62B 3/1424* (2013.01); *B62B 3/1412* (2013.01); *B62B 3/1416* (2013.01); *B62B 3/1428* (2013.01); *B62B 5/0096* (2013.01)

(58) Field of Classification Search
CPC ... B62B 3/1412; B62B 3/1416; B62B 3/1424; B62B 3/1428; B62B 5/0096
See application file for complete search history.

(56) References Cited

U.S. PATENT DOCUMENTS

| 5,361,871 A * | 11/1994 | Gupta | B62B 3/1408 186/52 |
| 5,773,954 A * | 6/1998 | VanHorn | G06K 7/10722 320/137 |
| 5,821,512 A * | 10/1998 | O'Hagan | G06K 7/0004 235/383 |
| 7,660,747 B2 | 2/2010 | Brice et al. | |
| 8,998,218 B1 * | 4/2015 | Bitondo | B62B 3/1488 280/33.992 |

(Continued)

FOREIGN PATENT DOCUMENTS

EP 3109130 A1 12/2016
KR 101830819 B1 2/2018

OTHER PUBLICATIONS

Extended European Search Report dated Jul. 29, 2019, filed in counterpart European Patent Application No. 19160256.4, 9 pages.

*Primary Examiner* — Brian L Swenson
(74) *Attorney, Agent, or Firm* — Kim & Stewart LLP

(57) ABSTRACT

A handcart includes a cart frame having a receiving portion on which a shopping basket is placeable and a handle portion, a caster disposed at a bottom region of the cart frame, a display mounting arm adjacent to the handle portion and extending upward from the cart frame, and a display device attached to an upper end of the display mounting arm. The display mounting arm is movable to position the display device at a location that is shifted to a left or a right side with respect to a center of the cart frame in a width direction thereof.

19 Claims, 5 Drawing Sheets

(56) References Cited

U.S. PATENT DOCUMENTS

| | | | |
|---|---|---|---|
| 9,969,415 B2 | 5/2018 | Chen et al. | |
| 10,081,382 B1* | 9/2018 | Alton | B62B 9/26 |
| 10,427,704 B2* | 10/2019 | Bacallao | B62B 3/1424 |
| 2006/0007191 A1* | 1/2006 | Chi | B62B 3/1424 |
| | | | 345/184 |
| 2006/0208072 A1* | 9/2006 | Ku | G07F 7/02 |
| | | | 235/383 |
| 2009/0140850 A1 | 6/2009 | Kangas et al. | |
| 2015/0206121 A1* | 7/2015 | Joseph | G06Q 20/208 |
| | | | 705/23 |
| 2015/0358044 A1* | 12/2015 | Barstead | H04B 1/3888 |
| | | | 455/575.1 |
| 2016/0207557 A1* | 7/2016 | Olivieri | B62B 3/1408 |
| 2019/0073656 A1* | 3/2019 | Joseph | G07G 1/0081 |
| 2019/0176864 A1* | 6/2019 | Hara | B62B 3/142 |

* cited by examiner

DISPLAY-COUPLED HANDCART

CROSS-REFERENCE TO RELATED APPLICATION

This application is based upon and claims the benefit of priority from Japanese Patent Application No. 2018-037832, filed on Mar. 2, 2018, the entire contents of which are incorporated herein by reference.

FIELD

An embodiment described herein relates generally to a handcart.

BACKGROUND

A customer uses a shopping cart in a store such as a supermarket or a shopping mall. In some stores, a shopping cart includes a scanner that reads commodity codes attached to commodities, so that the customer can scan the commodity codes attached to the commodities using the scanner. A shopping cart of one type further includes a display device that displays commodity names and the like.

However, depending on the position of the display device attached to the shopping cart, the display device may interfere with a customer's placement of the commodities in the shopping cart or a shopping basket thereon, and also may hinder the customer's view of the commodities in the shopping cart/basket.

Therefore, it is desirable to provide a handcart with a display device, so that a customer can easily place commodities in a shopping cart/basket and visually confirm the commodities placed in the shopping cart/basket.

DETAILED DESCRIPTION

An embodiment is directed to providing a handcart that makes it easy for a customer to put commodities in a shopping basket and confirm the commodities put in the shopping basket when a display device is provided in the handcart.

In general, according to an embodiment, a handcart includes a cart frame having a receiving portion on which a shopping basket is placeable and a handle portion, a caster disposed at a bottom region of the cart frame, a display mounting arm adjacent to the handle portion and extending upward from the cart frame, and a display device attached to an upper end of the display mounting arm. The display mounting arm is movable to position the display device at a location that is shifted to a left or a right side with respect to a center of the cart frame in a width direction thereof.

Figure 1:
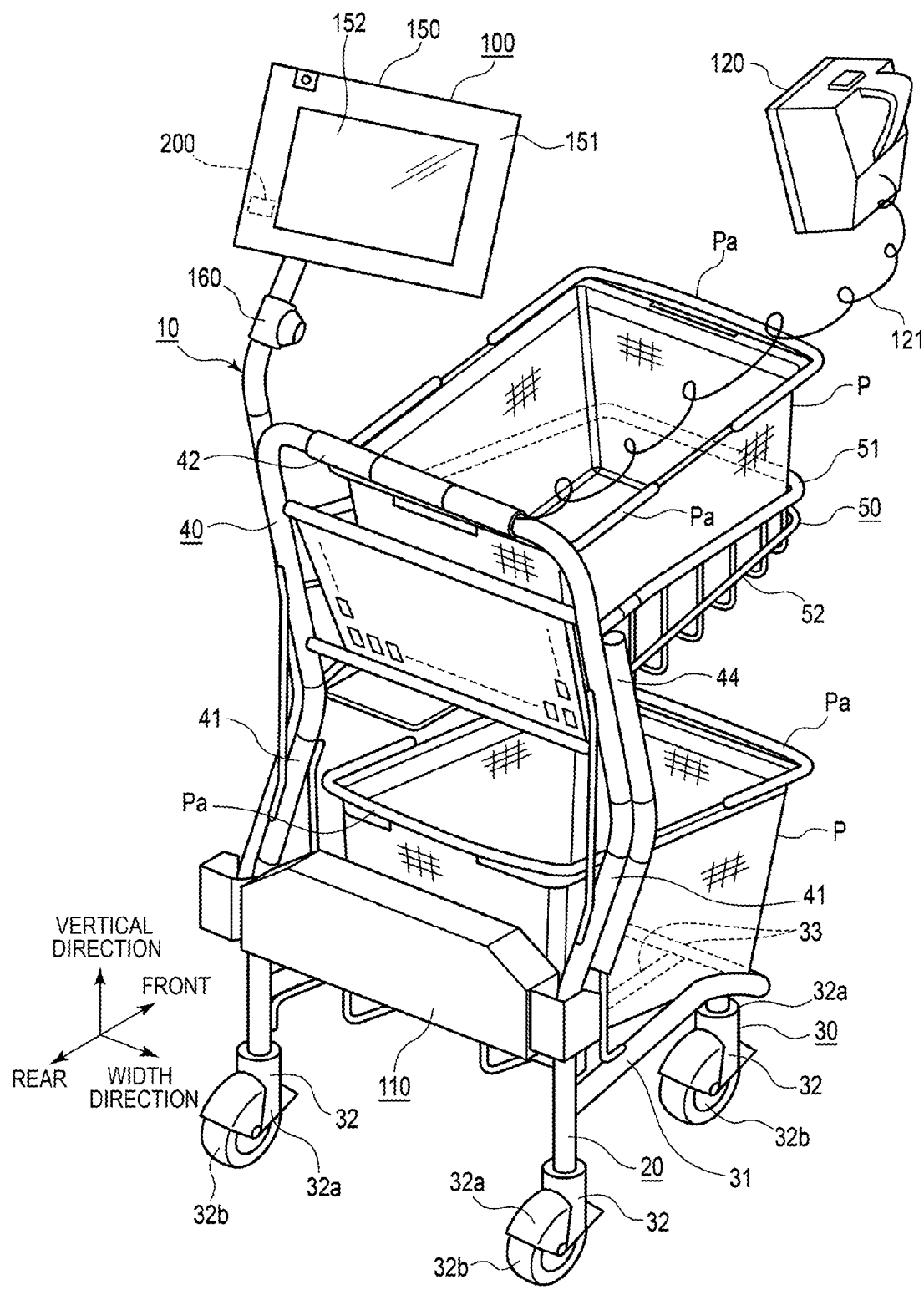
FIG. 1 illustrates an exterior perspective view of a shopping cart according to an embodiment.
Figure 2:
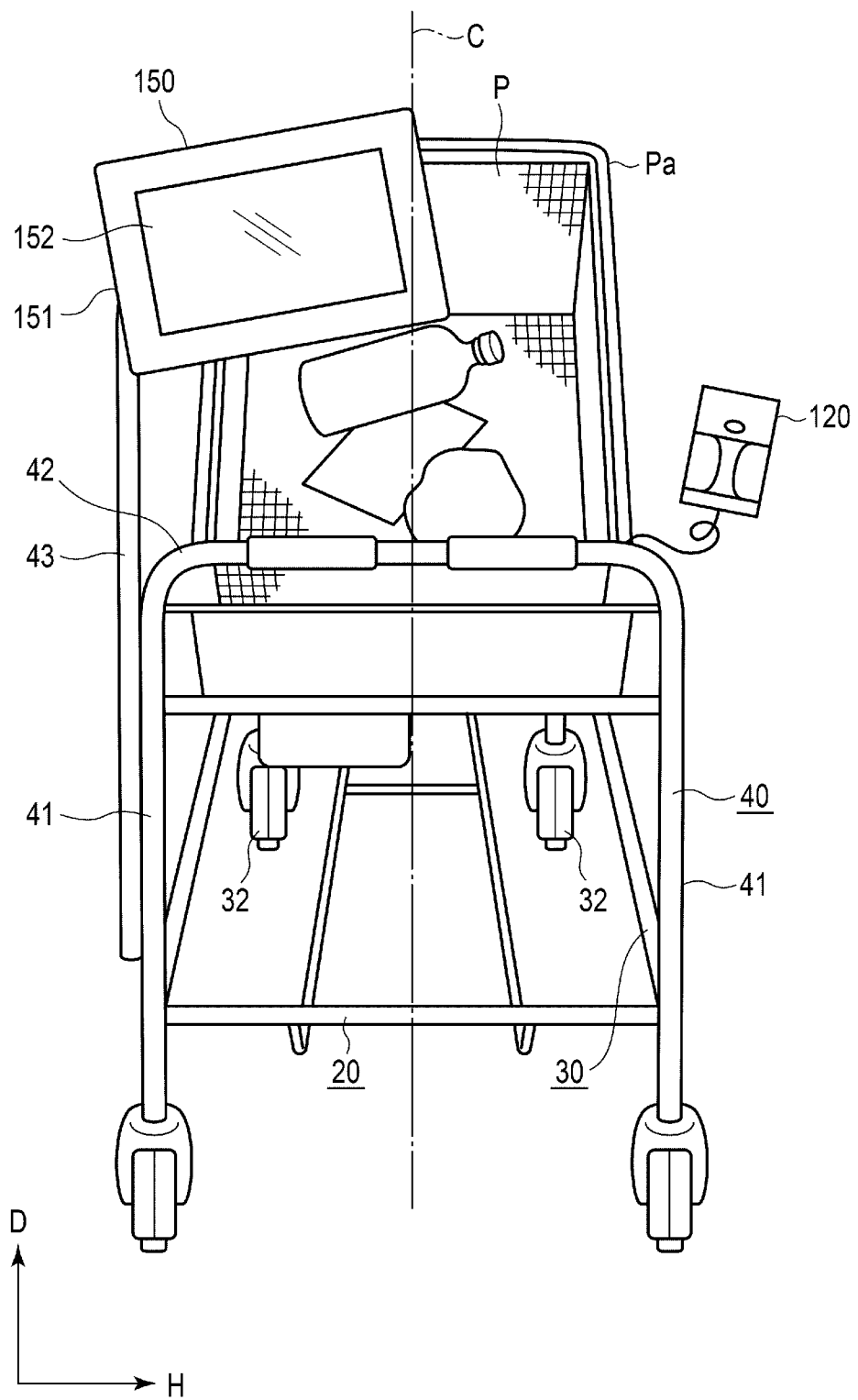
FIG. 2 illustrates a rear view of the shopping cart.
Figure 3:
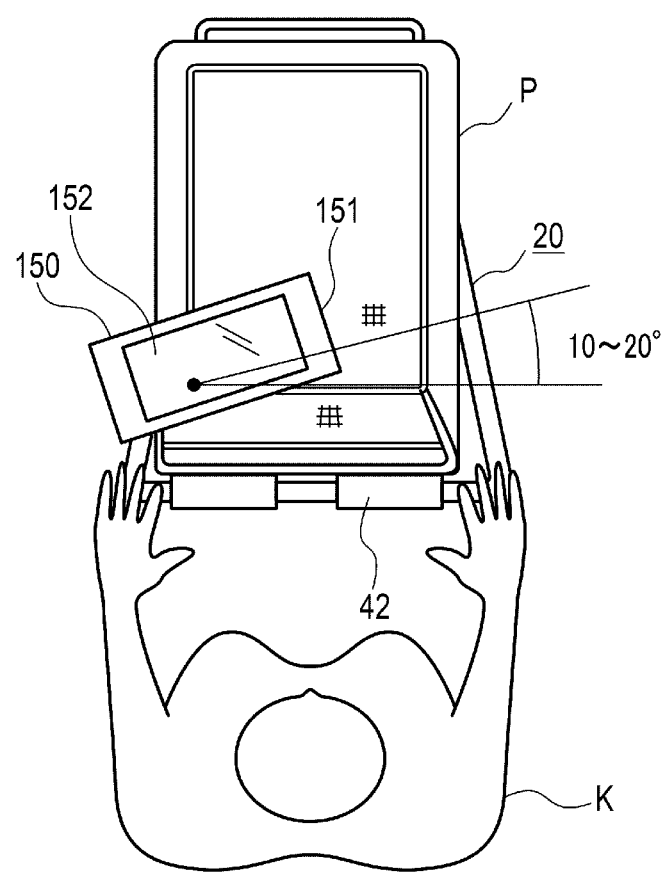
FIG. 3 illustrates a plan view of the shopping cart used by a user.
Figure 4:
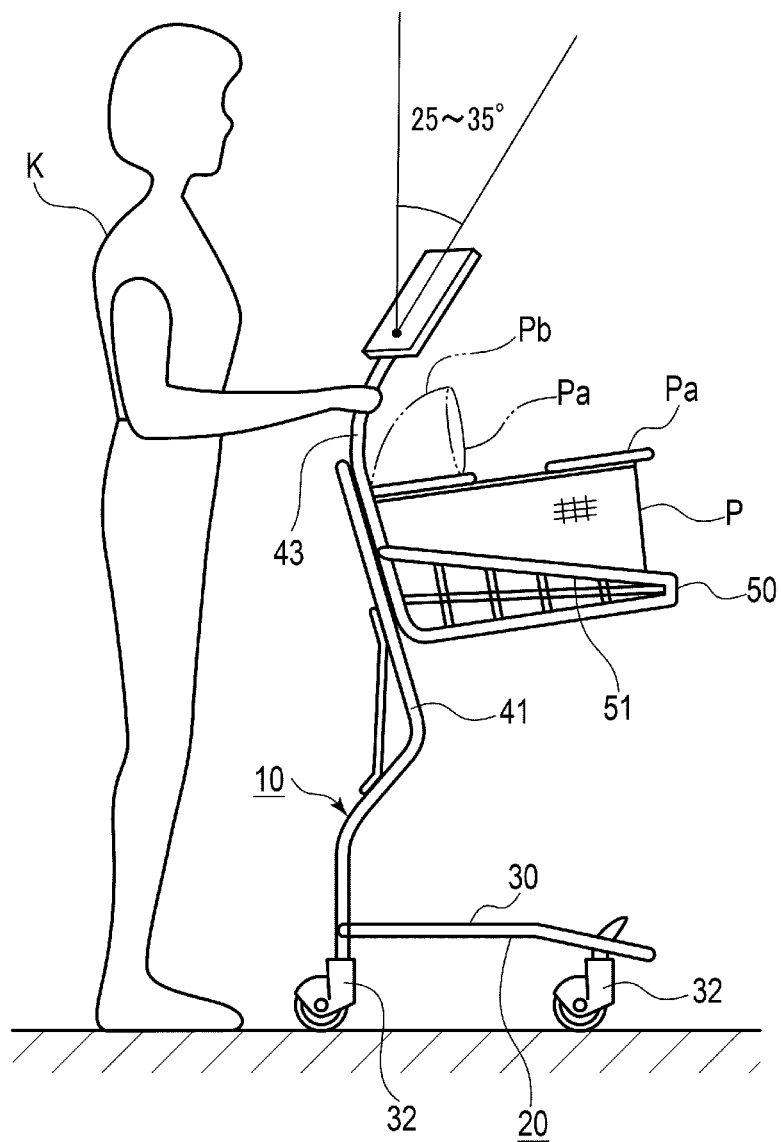
FIG. 4 illustrates a side view of the shopping cart used by the user.

An embodiment is described below with reference to the drawings. A shopping cart used in a store such as a supermarket is described as an example of a handcart. FIG. 1 illustrates an exterior perspective view of a shopping cart 10. FIG. 2 illustrates a rear view of the shopping cart 10. FIG. 3 illustrates a plan view of the shopping cart 10 used by a customer K. FIG. 4 illustrates a side view of the shopping cart 10 used by the customer K. In this embodiment, a handle frame section 40 side is referred to as a rear direction and a projecting direction of a basket receiving section 50 projecting from the handle frame section 40 is referred to as a front direction. The front direction and the rear direction are collectively referred to as front-rear direction. An arrow direction H horizontally orthogonal to the front-rear direction represents the width direction of a cart section 20. Further, K in FIGS. 3 and 4 represents a customer.

As illustrated in FIG. 1, the shopping cart 10 according to an embodiment includes a cart section 20 that carries a shopping basket P that stores commodities and an electrical section 100 attached to the cart section 20. The cart section 20 includes a caster section 30 for smoothly moving the shopping cart 10 on the floor surface, a handle frame section 40 vertically provided on a rear wheel side of the caster section 30, and a basket receiving section 50 provided in an intermediate position in the height direction of the handle frame section 40 to be directed forward. The shopping basket P can be placed on the caster section 30 and the basket receiving section 50 as appropriate. The shopping basket P includes a handle Pa that swings.

The caster section 30 includes a frame 31 having a square frame shape, the rear side of which is open, and casters 32 respectively provided at four corners of the frame 31. The casters 32 include brackets 32a that freely rotate around axes in the vertical direction and include, in the brackets 32a, wheels 32b that are made of rubber or resin and freely rotate in the horizontal direction. A receiving section 33 is provided in the frame 31. The receiving section 33 is formed in dimensions for allowing a lower part of the shopping basket P to fit in the receiving section 33.

The handle frame section 40 includes vertical frames 41 respectively attached to left and right rear wheel sides of the caster section 30 and a handlebar 42 in the horizontal direction that connects the upper ends of the vertical frames 41. An extended arm 43 is attached to the vertical frame 41 on the left side. A reinforcing material 44 is attached to the handle frame section 40.

The basket receiving section 50 includes a frame 51 having a square frame shape and a receiving section 52 provided on the lower side of the frame 51. The receiving section 52 is formed in dimensions for allowing the lower part of the shopping basket P to fit in the receiving section 52.

The electrical section 100 is provided above the caster section 30. A battery section 110 attached between the vertical frames 41 on the lower end side of the handle frame section 40 and a scanner 120 for reading a commodity code are provided. The electrical section 100 includes a display (a display device) 150 that displays various kinds of information such as a commodity name and a unit price of a commodity read by the scanner 120 and a camera 160 that images the inside of the shopping basket P and the like. The battery section 110 supplies electric power to the scanner 120, the display 150, and the camera 160 via a power line included in the handle frame section 40. The scanner 120 is connected to a cable included in the handle frame section 40 via a curled cord 121. The scanner 120, the display 150, and the camera 160 are connected to one another by the cable included in the handle frame section 40. The display 150 is attached to the upper end of the extended arm 43. The camera 160 is attached to a halfway part of the extended arm 43. The shopping cart 10 functioning as a register that reads a commodity code of a commodity that a customer desires to purchase is configured by these components.

The display 150 includes a display panel 152 having a touch panel function. The display panel 152 is provided on the front surface of a terminal housing 151. The display panel 152 is directed to the customer K side, that is, the rear side with respect to the front-rear direction.

A control section 200 that controls the battery section 110, the scanner 120, the display 150, and the camera 160 is provided on the inside of the terminal housing 151.

As illustrated in FIG. 2, the display 150 is disposed to be shifted to the left side with respect to a width direction center line C of the cart section 20. As illustrated in FIG. 4, the bottom end portion of the terminal housing 151 is disposed above a swinging range (an alternate long and two short dashes line Pb) of the handle Pa of the shopping basket P.

Further, the display 150 is disposed to be tilted to a direction in which the customer K can see the display panel 152. Specifically, the display 150 is disposed to be tilted at 10° to 20° to the center line C side with respect to a width direction H and tilted at 25° to 35° upward with respect to a vertical direction D.

The customer K performs shopping as described below using the shopping cart 10 configured as described above. The shopping cart 10 is placed in an entrance or the like of the store. The customer K pulls out the shopping cart 10 that the customer K uses. The customer K takes the shopping basket P and places the shopping basket P on at least one of the caster section 30 and the basket receiving section 50. It is assumed that the customer K places the shopping baskets P respectively on the caster section 30 and the basket receiving section 50. The customer K moves the shopping cart 10 toward a commodity shelf on which commodities are displayed by pushing the handlebar 42.

The customer K takes out a target commodity from the commodity shelf and brings a commodity code of the commodity close to the scanner 120. Consequently, the commodity code is read by the scanner 120. Read information is sent to the control section 200 and displayed on the display panel 152 as a commodity name and an amount. The customer K puts the commodity in the shopping basket P placed on the caster section 30 or the basket receiving section 50.

At this time, since the display 150 is shifted to the left side from the center line, the customer K can take out a commodity from the commodity shelf and easily put the commodity in the shopping basket P on the basket receiving section 50 without being obstructed by the display 150. The customer K can handle a heavy component (e.g., a beverage or rice) in the same manner.

The bottom end portion of the terminal housing 151 of the display 150 is disposed above the swinging range (the alternate long and two short dashes line Pb) of the handle Pa of the shopping basket P. Therefore, the handle Pa of the shopping basket P does not interfere with the display 150. As a result, usability of the shopping cart 10 by the customer K can be improved.

Further, the display 150 is tilted to the direction in which the customer K can see the display panel 152. Specifically, the display 150 is tilted at 10° to 20° to the center line C side with respect to the width direction H and tilted at 25° to 35° upward with respect to the vertical direction D. Consequently, the line of sight of the customer K and the surface of the display panel 152 are substantially orthogonal to each other. The customer K can easily see display on the display panel 152.

Figure 5:
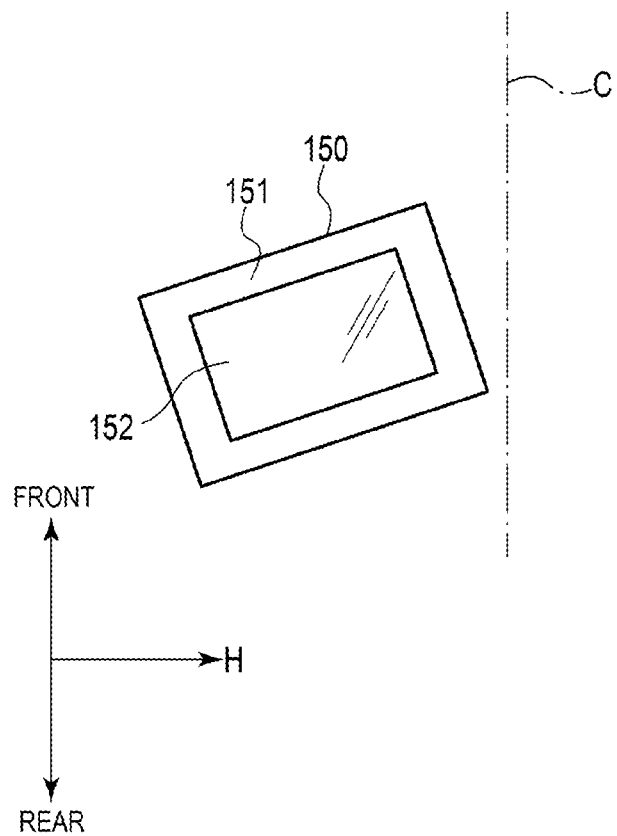
FIG. 5 is a diagram illustrating a positional relation between a center line of the shopping cart and a display device.

FIG. 5 is a diagram illustrating a modification of a positional relation between the center line C of the shopping cart 10 and the display 150. That is, in the embodiment described above, the right end of the display 150 is located further on the right side than the center line C. However, the right end of the display 150 may be located further on the left side than the center line C. Consequently, the customer K can more easily see commodities in the shopping basket P.

The position, the direction, and the like of the display 150 are not limited to the position, the direction, and the like described above. The display 150 only has to be directed to a direction that does not interference with the handle Pa of the shopping basket P, so that the customer K can easily see commodities in the shopping basket P and can easily see display on the display panel 152.

While a certain embodiment is explained above the embodiment is presented as an example and is not intended to limit the scope of the invention. The new embodiment can be implemented in other various forms. Various omissions, substitutions, and changes can be performed without departing from the spirit of the invention. The embodiment and modifications of the embodiment are included in the scope and the gist of the invention and included in the inventions described in claims and the scope of equivalents of the inventions.

What is claimed is:

1. A handcart comprising:
    a cart frame including a receiving portion on which a shopping basket is placeable and a handle portion, wherein the receiving portion having a size substantially same as a size of the shopping basket such that the shopping basket fits in the receiving portion when the shopping basket is placed on the receiving portion with a longer side of the shopping basket aligned with a length direction of the cart frame, and does not fit in the receiving portion when the shopping basket is placed on the receiving portion with a shorter side of the shopping basket aligned with the length direction of the cart frame;
    a caster disposed at a bottom region of the cart frame;
    a display mounting arm adjacent to the handle portion and extending upward from the cart frame; and
    a display device attached to an upper end of the display mounting arm,
    wherein the display mounting arm is movable to position the display device at a location that is shifted to a left or a right side with respect to a center of the cart frame in a width direction thereof and does not overlap with a movement range of a handle of the shopping basket that is placed on and is fit in the receiving portion, wherein the handle rotates along the length direction of the cart frame with the shopping basket being placed on and fit in the receiving portion.

2. The handcart according to claim 1, wherein the display mounting arm is movable to position the display device at a location where the entire portion of the display device is positioned on the left or the right side with respect to the center of the cart frame.

3. The handcart according to claim 1, wherein the display device is attached to the display mounting arm so as to be rotatable with respect to the display mounting arm about an axis that extends in the length direction of the cart frame.

4. The handcart according to claim 3, wherein the display device is rotated so that a tilt angle of the display device with respect to a width direction of the cart frame is greater than or equal to 10° and less than or equal to 20°.

5. The handcart according to claim 1, wherein the display device is attached to the display mounting arm so as to be rotatable with respect to the display mounting arm about an axis that extends in a width direction of the cart frame.

6. The handcart according to claim 5, wherein the display device is rotated so that a tilt angle of the display device with respect to the length direction of the cart frame is greater than or equal to 25° and less than or equal to 35°.

7. The handcart according to claim 1, wherein the display mounting arm is disposed at a left or right end region of the cart frame.

8. The handcart according to claim 7, further comprising:
a code scanner coupled to the cart frame via a flexible wire, the wire extending from a right or left region of the cart frame opposite to the left or right end region of the cart frame at which the display mounting arm is disposed.

9. The handcart according to claim 1, further comprising:
a camera positioned to capture an image of a region that includes an inner space of the shopping basket.

10. The handcart according to claim 9, wherein the camera is mounted on the display mounting arm at a position below the display device.

11. The handcart according to claim 1, further comprising:
a battery coupled to a portion of the cart frame below the handle portion, the battery being electrically connected to the display device to supply power thereto.

12. A handcart comprising:
a cart frame including a receiving portion on which a shopping basket is placeable and a handle portion, wherein the receiving portion having a size substantially same as a size of the shopping basket such that the shopping basket fits in the receiving portion when the shopping basket is placed on the receiving portion with a longer side of the shopping basket aligned with a length direction of the cart frame, and does not fit in the receiving portion when the shopping basket is placed on the receiving portion with a shorter side of the shopping basket aligned with the length direction of the cart frame;
a caster disposed at a bottom region of the cart frame;
a display mounting arm adjacent to the handle portion and extending upward from the cart frame; and
a display device attached to an upper end of the display mounting arm,
wherein the display mounting arm is movable to position the display device at a location that does not overlap with a movement range of a handle of the shopping basket that is placed on and fit in the receiving portion, wherein the handle rotates along the length direction of the cart frame with the shopping basket being placed on and fit in the receiving portion.

13. The handcart according to claim 12, wherein the display device is attached to the display mounting arm so as to be rotatable with respect to the display mounting arm about an axis that extends in the length direction of the cart frame.

14. The handcart according to claim 13, wherein the display device is rotated so that a tilt angle of the display device with respect to a width direction of the cart frame is greater than or equal to 10° and less than or equal to 20°.

15. The handcart according to claim 12, wherein the display device is attached to the display mounting arm so as to be rotatable with respect to the display mounting arm about an axis that extends in a width direction of the cart frame.

16. The handcart according to claim 15, wherein the display device is rotated so that a tilt angle of the display device with respect to the length direction of the cart frame is greater than or equal to 25° and less than or equal to 35°.

17. The handcart according to claim 12, wherein the display mounting arm is disposed at a left or right end region of the cart frame.

18. The handcart according to claim 17, further comprising:
a code scanner coupled to the cart frame via a flexible wire, the wire extending from a right or left region of the cart frame opposite to the left or right end region of the cart frame at which the display mounting arm is disposed.

19. The handcart according to claim 12, further comprising:
a camera mounted on the display mounting arm at a position below the display device and positioned to capture a region that includes an inner space of the shopping basket; and
a battery coupled to a portion of the cart frame below the handle portion, the battery being electrically connected to the display device to supply power thereto.

* * * * *